(No Model.)
M. MAUERMANN.
GARDEN CULTIVATOR.
No. 307,481. Patented Nov. 4, 1884.
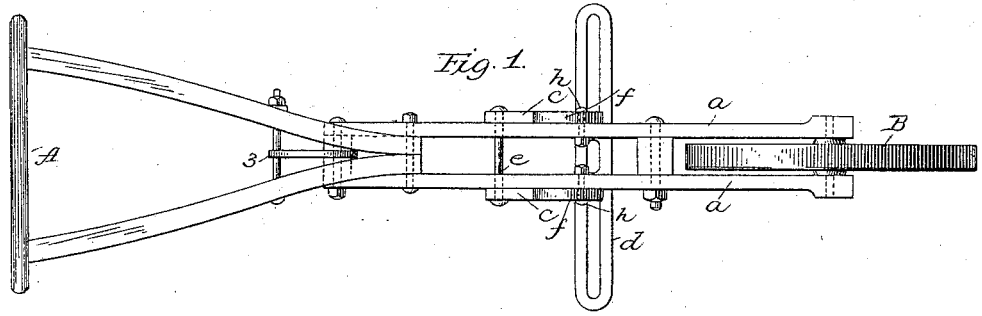
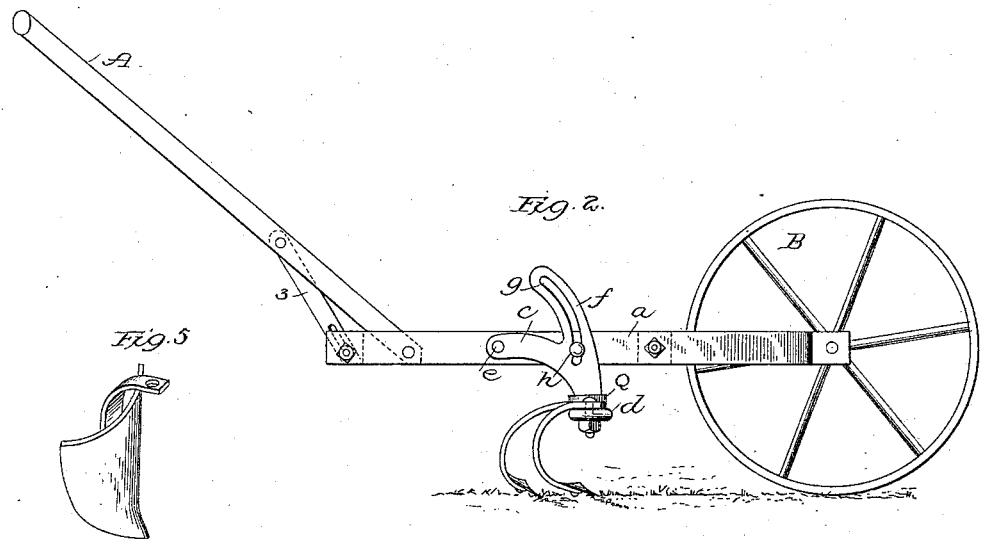
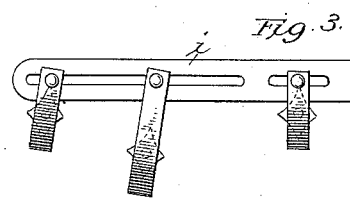
Attest:
Walter Douala
F. L. Middleton
Inventor:
Mathias Mauermann
by Joyce & Spear
Attys.

UNITED STATES PATENT OFFICE.

MATHIAS MAUERMANN, OF GRAND RAPIDS, MICHIGAN.

GARDEN-CULTIVATOR.

SPECIFICATION forming part of Letters Patent No. 307,481, dated November 4, 1884.

Application filed May 9, 1884. (No model.)

*To all whom it may concern:*

Be it known that I, MATHIAS MAUERMANN, of Grand Rapids, in the county of Kent and State of Michigan, have invented a new and useful Improvement in Garden-Cultivators; and I do hereby declare that the following is a full, clear, and exact description of the same.

My invention is an improvement in garden-cultivators adapted to be operated by hand either by pushing or pulling, or both.

It consists in the details of construction by which I render the implement simple and cheap to manufacture, and of such few parts that there is no danger of their getting out of order.

In the drawings, Figure 1 represents a plan view of my cultivator; Fig. 2, a side elevation of the same; Fig. 3, a view detached of the bar supporting the cultivator-teeth; Figs. 4 and 5, detail views of the teeth or shovels, and Fig. 6 a modification of an attachment to be substituted for the teeth.

The great object in the construction of garden implements is to make them as light as possible, and in my present invention I have endeavored to be guided by this known necessity. The frame is composed of parallel beams $a$ $a$, secured together by bolts, any suitable number of which may be employed, the beams being kept the proper distance apart by means of blocks inserted between them, they being held in place, preferably, by the bolts passing through them also. I provide a handle, A, composed of two rods running to a point between the beams, where they are held by a suitable bolt and a cross-piece for the upper ends of the same, which are a suitable distance apart to provide ample room for the operator to push the implement along. The handles may be raised or lowered in any well-known manner to suit the height of the operator. The beams are strengthened or enlarged at the front ends, and in these the journals of a wheel, B, have their bearings, whereby the depth of cut is regulated and the passage of the implement over the ground more easily accomplished. This wheel may be of any suitable size, and turns in the space between the frame.

My improved supporting device for the cultivating attachments is preferably arranged about midway between the wheel and handles; but it will be obvious that the location may be changed, if found desirable. This supporting device consists of a casting having curved arms $c$ $c$, adapted to the outside of the frame-beams, and connected at the bottom beneath the frame by a horizontal slotted plate or bar, $d$, to which the attachments or their immediate supports are secured. The arms $c$ $c$ extend in a curve to the rear, and are pivoted to the frame on the outside thereof, as before stated, by a pivot-rod, $e$. Extending from the front of the casting on each side are arms $f$ $f$, curved slightly to the rear, and slotted, as at $g$. These arms fit the sides of the frame snugly, and the casting has a limited amount of movement in an approximately vertical direction on the pivot $e$, being guided by pins $h$ $h$, set in the frame and working in the slots of the arms $f$ $f$. The lower plate or bar, $d$, may be a connecting-piece of metal with slotted ends projecting beyond the frame-beams, and to this the support for the teeth or shovels may be secured. In one form I use a bar, $i$, slotted, as shown, and to this, by means of pins and nuts, I secure the cultivator-teeth at suitable intervals. When the teeth are properly set, I secure the bar to the plate $d$ by bolts and nuts in any well-known way. Preferably I use washers Q, cut with a beveled side, as shown in the detail figure, which washer is interposed between the plate $d$ and the bar $i$, thus compensating for the inclination which would be given to the bar and teeth by the adjustment of the casting, as described. Instead of these cultivator-teeth shovels may be used, such as those shown.

At times it may be desirable to use a hoe or cutter for weeds and the like, instead of the cultivator teeth or shovels, and this I have shown in Fig. 6. I preferably form it of a metal plate of suitable width, length, and thickness, with the edges sharpened. The ends I bend up, as shown at 1 1, and form, preferably, screw-threads on the reduced portions, as shown at 2 2. This I secure to the lower plate, $d$, of the casting, as before described for the cultivator-support, and operate in the same manner, adjusting the casting to raise or lower the cutter or teeth as may happen to be in use. These parts are all readily interchangeable. The handle is supported by a supplemental bar or rod, 3, extending from a brace-rod between the handles to the block at the rear of the frame.

What I claim as my invention, and desire to secure by Letters Patent, is—

1. In a cultivator, the combination, with the frame and handles, of the casting carrying the cultivator-teeth or their support pivoted to the frame at a point in rear of said teeth, and adapted to be adjusted vertically by means of the slotted arms $ff$, as described.

2. In a cultivator, the combination of the casting composed of the arms pivoted to the frame, the slotted arms $ff$, working on pins in the frame, and the connecting-plate $d$, adapted for attachment with the cultivator-teeth or their support, substantially as described.

In testimony whereof I have signed my name to this specification in the presence of two subscribing witnesses.

MATH. MAUERMANN.

Witnesses:
JOSEPH KRUSE,
EDWIN VAN HOUTEN.